(12) United States Patent
Prakash et al.

(10) Patent No.: US 11,214,350 B2
(45) Date of Patent: Jan. 4, 2022

(54) SOUND ATTENUATION PANEL AND METHODS OF CONSTRUCTING AND INSTALLING THE SAME

(71) Applicant: THE BOEING COMPANY, Chicago, IL (US)

(72) Inventors: Om Prakash, Bengaluru (IN); Megha Sahu, Bengaluru (IN); Shantanu Bhattacharya, Kanpur (IN); Sanjay Kumar, Bengaluru (IN); Pulak Bhushan, Jaipur (IN)

(73) Assignee: THE BOEING COMPANY, Chicago, IL (US)

( * ) Notice: Subject to any disclaimer, the term of this patent is extended or adjusted under 35 U.S.C. 154(b) by 529 days.

(21) Appl. No.: 16/257,261

(22) Filed: Jan. 25, 2019

(65) Prior Publication Data

US 2020/0239125 A1    Jul. 30, 2020

(51) Int. Cl.
| | |
|---|---|
| *B64C 1/40* | (2006.01) |
| *B33Y 10/00* | (2015.01) |
| *B33Y 80/00* | (2015.01) |
| *B64D 33/02* | (2006.01) |
| *G10K 11/172* | (2006.01) |

(52) U.S. Cl.
CPC .................. *B64C 1/40* (2013.01); *B33Y 10/00* (2014.12); *B33Y 80/00* (2014.12); *B64D 2033/0206* (2013.01); *G10K 11/172* (2013.01)

(58) Field of Classification Search
CPC ........... B33Y 10/00; B33Y 80/00; B64C 1/40; G10K 11/172; B64D 2033/0206
USPC ...................................................... 181/284
See application file for complete search history.

(56) References Cited

U.S. PATENT DOCUMENTS

| 8,047,329 B1 | 11/2011 | Douglas et al. |
| 2013/0341119 A1 | 12/2013 | Ichihashi |

FOREIGN PATENT DOCUMENTS

EP    1682385 B1    10/2008

OTHER PUBLICATIONS

Szabo "Time Domain Wave Equations for Lossy Media Obeying a Frequency Power Law" The Journal of Acoustical Society of America; 1194 (10 pages).
Mei et al. "Dark Acoustic Metamaterials as Super Absorbers for Low-Frequency Sound" Nature Communications; 2012 (7 pages).
Springer "Acknowledgements" Springer Handbook of Acoustics; 2007 (43 pages).

(Continued)

*Primary Examiner* — Forrest M Phillips
(74) *Attorney, Agent, or Firm* — The Small Patent Law Group LLC; Philip S. Hof

(57) ABSTRACT

A sound attenuation panel that includes an incident wall and a frame unit connected to the incident wall. The incident wall defines an aperture therethrough. The frame unit includes multiple spoke members spaced apart from one another and radially extending from one or more central hub openings of the frame unit. The one or more central hub openings align with the aperture of the incident wall. The frame unit defines channels between adjacent pairs of the spoke members. The channels fluidly connect to the one or more central hub openings. The frame unit is configured to receive sound waves into the central hub opening through the aperture of the incident wall to dissipate the sound waves through the channels between the spoke members.

20 Claims, 7 Drawing Sheets

(56) References Cited

OTHER PUBLICATIONS

Cai et al. "Ultrathin Low-Frequency Absorbing Panels based on Coplanar Spiral Tubes or Coplanar Helmholtz Resonators" Applied Physics Letters; 2014 (4 pages).
Yang "Sound Absorption by Subwavelength Membrane Structures: A generalized Perspective" ARXIV; 2015 (8 pages).
Fu et al. "Hybrid Membrane Resonators for Multiple Frequency Asymmetric Absorption and Reflection in Large Waveguide" Appllie Physics Letters 105; 2017 (10 pages).
Long et al. "Asymmetric Absorber with Multiband and Broadback for Low-Frequency Sound" Applied Physics Letters 111; 2017 (5 pages).
Tang et al. "Hybrid Acoustic Metamaterial as Super Absorber for Broadband Low-Frequency Sound" Scientific Reports; 2017 (11 pages).
Sanada et al. "Extension of the Frequency Range of Resonant Sound Absorbers using Two-Degree-of-Freedom Helmholtz-based Resonators with a Flexible Panel" Applied Acoustics; 2013 (8 pages).
Song et al. "Acoustic Coherent Perfect Absorbers" New Journal of Physics; 2014 (13 pages).
Zhou et al. "Percise Rainbow Trapping for Low-Frequency Acoustic Waves with Micro Mie Resonance-Based Structures" Applied Physics Letters 108; 2016 (5 pages).
Chen et al. "A Low-Frequency Sound Absorbing Material with Subwavelength Thickness" Applied Physics Letters 110; 2017 (5 pages).
Liang et al. "Space-Coiling Metamaterials with Double Negativity and Conical Dispersion" Scientific Reports; 2013 (6 pages).
Li et al. "Acoustic Focusing by Coiling Up Space" Applied Physics Letters 101; 2012 (5 pages).
Ruiz et al. "Optimization of Multiple-Later Microperforated Panels by Simulated Annealing" Applied Acoustics; 2011 (5 pages).
Maa "Potential of Microperorated Panel Absorber" Journal of Acoustical Society of America 104; 1998 (6 pages).
Li et al. "Acoustic Metasurface-Based Perfect Absorber with Deep Subwavelength Thickness" Applied Physics Letters 108; 2016 (4 pages).
Atalla et al. "Acoustic Absorption of Macro-Perforated Porous Materials" Journal of Sound and Vibration; 2001 (20 pages).
Hong et al. "A Novel Composite Sound Absorber with Recycled Rubber Particles" Journal of Sound and Vibration; 2007 (7 pages).
Utsuno et al. "Transfew Function Method for Measuring Characteristic Impedance and Propagation Constant of Porous Materials" Journal of Acoustical Society of America 86; 1989 (7 pages).
Lu et al. "Sound Absorption in Metallic Foams" Journal of Applied Physics; 1999 (12 pages).
Yang et al. "Acoustic Metamaterial Panels for Sound Attenuation in the 50-1000 Hz Regime" Applied Physics Letters 96; 2010 (3 pages).
Naify et al. "Transmission Loss and Dynamic Response of Membrane-Type Locally Resonant Acoustic Metamaterials" Journal of Applied Physics 108 (7 pages).
Sui et al. "A Lightweight Yet Sound-Proof Honeycomb Acoustic Metamaterial" Applied Physics Letters 106 (4 pages).
Lu et al. "A lightweight Low-Frequency Sound Insulation Membrane-Type Acoustic Metamaterial" American Institute of Physics; 2016 (10 pages).
U.S. Appl. No. 15/719,854, filed Sep. 29, 2017, entitled "Composite Sound Absorption Panel Assembly" (35 pages).
Extended European Search Report and Written Opinion for corresponding EP Application No. 19205492.2-1001 dated Apr. 24, 2020.
First Examination Report for related Indian Patent Application No. 202014000711 dated Oct. 11, 2021 (6 pages).

SOUND ATTENUATION PANEL AND METHODS OF CONSTRUCTING AND INSTALLING THE SAME

FIELD

Embodiments of the present disclosure generally relate to sound-absorbing panel constructions, and, more particularly, to acoustic structures configured to absorb sound at tunable frequency ranges to dampen noise within, for example, interior cabins of aircraft and other vehicles.

BACKGROUND

Sound-absorbing materials are desirable in various applications that involve people or are near people because exposure to high noise levels can cause hearing loss, increase stress, and interfere with communication. Some conventional acoustic absorption materials are not able to sufficiently absorb noise in low frequency ranges. For example, the absorption of sound in deep subwavelengths by homogenous materials is a challenging task because the dissipative power is quadratic in the acoustic field amplitudes and requires higher energy density in the material. The sound absorption in this domain requires either a higher field concentration or a longer sound wave path. Some known conventional methods of acoustic absorption make use of perforated panels, porous and fibrous materials, gradient index materials, and the like. These materials are often associated with poor sound absorption capabilities in the low frequency regime and require a very thick structure with dimensions comparable to the working wavelength. The structures may be too thick and/or heavy for some applications, such as aircraft applications, in which component sizes and weights are strictly regulated.

A need exists for a sound-absorbing panel that effectively dampens noise within a frequency range of interest, such as at low frequencies, and is lightweight and thin.

SUMMARY

With those needs in mind, certain embodiments of the present disclosure provide a sound attenuation panel that includes an incident wall and a frame unit connected to the incident wall. The incident wall defines an aperture therethrough. The frame unit includes multiple spoke members spaced apart from one another and radially extending from one or more central hub openings of the frame unit. The one or more central hub openings align with the aperture of the incident wall. The frame unit defines channels between adjacent pairs of the spoke members. The frame unit is configured to receive sound waves into the one or more central hub openings through the aperture of the incident wall to dissipate the sound waves through the channels between the spoke members.

Certain embodiments of the present disclosure provide a method for constructing a sound attenuation panel. The method includes forming a frame unit in-situ on a first wall. The frame unit includes multiple spoke members spaced apart from one another and radially extending from a central hub opening of the frame unit. The frame unit defines channels between adjacent pairs of the spoke members. The channels are fluidly connected to the central hub opening. The method also includes forming a second wall in-situ on the frame unit along an opposite side of the frame unit from the first wall. One of the first wall or the second wall defines an aperture that aligns with the central hub opening of the frame unit. The frame unit is configured to receive sound waves into the central hub opening through the aperture to dissipate the sound waves through the channels between the spoke members.

Certain embodiments of the present disclosure provide a method for installing a sound attenuation panel on an aircraft. The method includes providing the sound attenuation panel that includes an incident wall and multiple frame units connected to and extending from the incident wall. The incident wall defines multiple apertures therethrough. Each of the frame units includes multiple spoke members spaced apart from one another and radially extending from a central hub opening of the respective frame unit. The frame units define channels between adjacent pairs of the spoke members. The channels radially emanate from the central hub openings. The method also includes affixing the sound attenuation panel to a wall of the aircraft such that the frame units are disposed between the incident wall and the wall of the aircraft. The frame units are configured to receive sound waves into the central hub openings through the incident wall, and to dissipate the sound waves through the channels between the spoke members.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION

Figure 1:
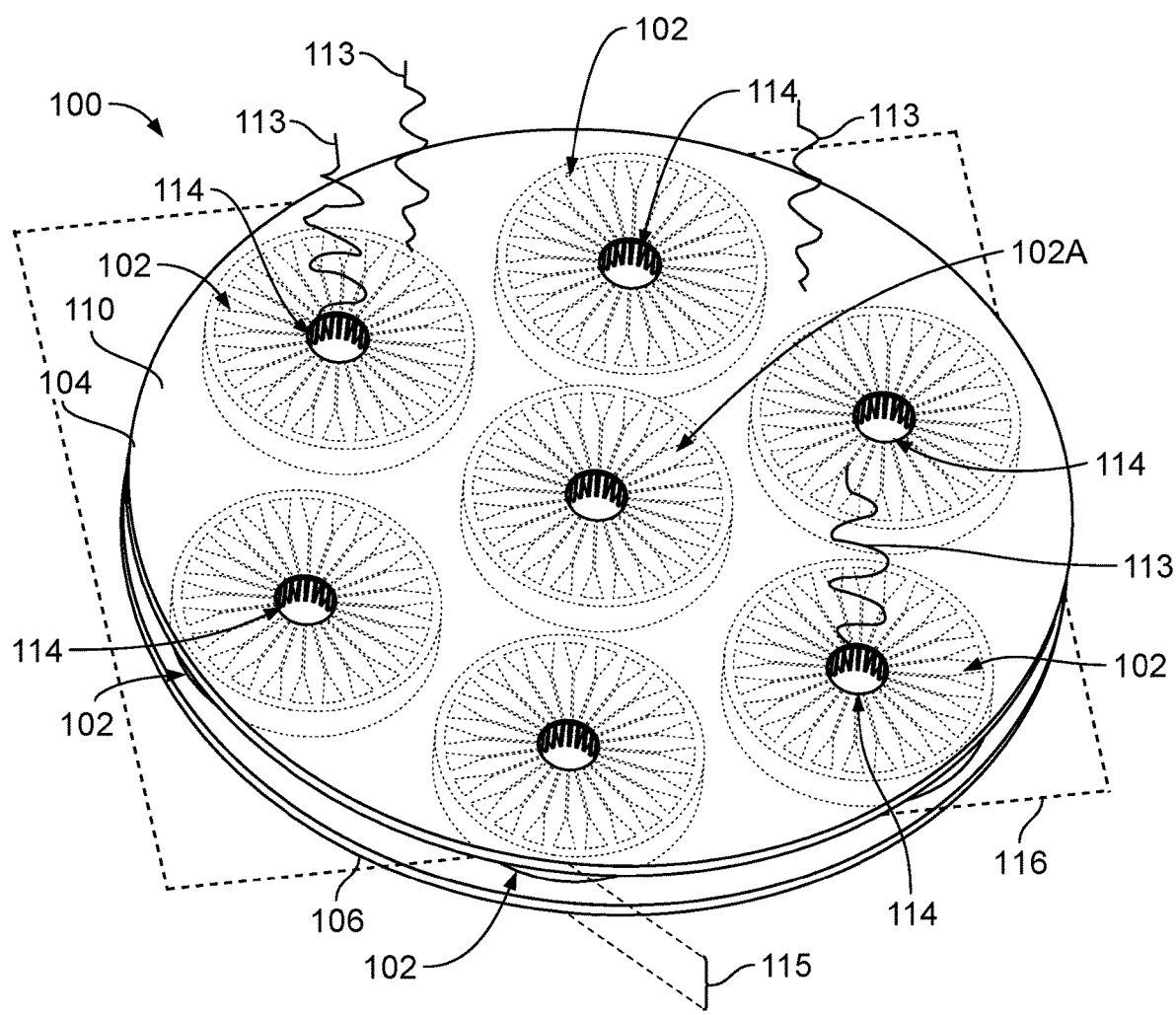
FIG. 1 is a perspective view of a portion of a sound attenuation panel according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a sound attenuation panel that can be used within a vehicle, such as a commercial aircraft, as well as within various facilities, such as manufacturing plants, factories, and offices, as well as other noise damping applications. The sound attenuation panel of the embodiments described herein may be produced in the form of tiles, films, wall panels, or the like, and can be selectively sized and conformed (e.g., contoured) to surround noise generators and/or cover walls.

The sound attenuation panel described in one or more embodiments herein has a structural architecture that includes one or more frame units disposed between two walls that sandwich the one or more frame units. The structural architecture is designed to passively control, direct, and manipulate sound waves that impinge upon the sound attenuation panel. Each of the one or more frame units includes a central hub opening and a plurality of spoke members that radially extend from the central hub opening. The spoke members are rib-like and are spaced apart from one another to resemble the spokes of a wheel, such as a bicycle wheel. Adjacent spoke members in the same frame unit define a channel therebetween, such that the channel is confined in one dimension (e.g., laterally) between the two adjacent spoke members and the channel is confined in another dimension (e.g., vertically) between the two walls. The sound attenuation panel is designed to receive sound waves into the central hub opening of the frame unit(s), and the sound waves are distributed and dissipated through the channels between the spoke members. The channels may confine the sound waves similar to a waveguide. The channels may function as resonance chambers, such as Helmholtz resonators. The sound waves may be dissipated within the channels via viscous damping and structural vibrations. For example, the acoustic energy may be converted to mechanical energy and/or thermal energy within the sound attenuation panels, and the mechanical energy and/or thermal energy is absorbed and attenuated along the lengths of the channels moving away from the central hub opening.

The embodiments of the sound attenuation panel described herein can have parameters that are tuned to provide certain desired acoustic properties. For example, the sound attenuation panel may provide relatively high sound absorption (e.g., a high absorption coefficient and/or high sound transmission loss) at one or more frequency ranges of interest, such as at low frequencies (e.g., less than 1600 Hz). In an example application in which the sound attenuation panel is installed on an aircraft, the sound attenuation panel may be tuned to provide relatively high sound absorption at a frequency range present within interior cabins of the aircraft to reduce the noise experienced by the passengers and crew onboard the aircraft.

In one or more embodiments, the sound attenuation panel assembly can be produced via relatively cost-efficient manufacturing methods. For example, the sound attenuation panel can be assembled via an additive manufacturing process, such as 3D printing or the like. Optionally, the sound attenuation panel may be produced in one continuous additive manufacturing process that forms both of the walls and all of the frame units disposed between the walls. For example, the additive manufacturing process may form a first wall, then may form the one or more frame units in-situ on the first wall, and finally may form the second wall in-situ on the one or more frame units, such that the sound attenuation panel has a unitary, monolithic construction. In an alternative embodiment, only one of the walls is formed with the one or more frame units during a common additive manufacturing process, and the other wall may be discretely formed and subsequently affixed to the one or more frame units. In other alternative embodiments, the sound attenuation panel may be constructed via a process other than additive manufacturing, such as by injection molding, compression molding, stamping, or the like.

The manufacturing process is scalable, and the resulting sound attenuation panel can be used in noise shielding applications of various areas and shapes. For example, the sound attenuation panel can be placed within an interior cabin of an aircraft, within an engine compartment of an aircraft to surround the engine (e.g., cowl, nacelle, and the like), on exterior walls of buildings (e.g., airports, office buildings, etc.), on noise barriers that extend along highways, and the like.

Additionally, the sound attenuation panel may be constructed to be relatively thin and lightweight, which enables the sound attenuation panel to be used in a variety of applications. The thickness of the sound attenuation panel may be selectable within a given range, such as between about 3 mm and about 20 mm. The relatively large range of allowable thicknesses provides options in how the sound attenuation panel is implemented for a specific application. For example, the sound attenuation panel may be formed as a shell, interconnecting panels, tiles, or a film or coating that is applied onto a curved or flat surface (e.g., similar to the application of wallpaper). In a non-limiting example, the sound attenuation panel may have a thickness of less than 10 mm (e.g., 1 cm), and may provide better sound absorption than known acoustic absorption structure when constructed to have a similar thickness. For example, some known acoustic absorption structures may not be configurable have such a thin construction, and other known acoustic absorption structures that are able to be thinly configured are not able to provide the same level of sound absorption as the sound attenuation panel described herein, at least at select frequency ranges of interest such as low frequencies.

FIG. 1 is a perspective view of a portion of a sound attenuation panel 100 according to an embodiment of the present disclosure. The sound attenuation panel 100 (also referred to herein as panel 100) includes multiple frame units 102 sandwiched between a first wall 104 and a second wall 106. The frame units 102 are arranged in an array between the first and second walls 104, 106. The frame units 102 in the array are disposed side by side in a common plane 116 and are spaced apart from one another. In the illustrated embodiment, a central frame unit 102A is surrounded by six other frame units 102 in the array. Although the portion of the panel 100 shown in FIG. 1 has seven frame units 102, the panel 100 may have more or less than seven frame units 102, such as hundreds or thousands of frame units 102 depending on the area of the panel 100.

The panel 100 is oriented in FIG. 1 to prominently show an exterior side 110 of the first wall 104. The frame units 102 are shown in phantom in FIG. 1 because the frame units 102 are located behind the first wall 104. For example, the frame units 102 are disposed along and connected to an interior side 112 (shown in FIG. 3) of the first wall 104 that is opposite the exterior side 110. The frame units 102 may be connected to the first wall 104 such that the frame units 102 are in direct physical contact with the interior side 112. As described herein, the frame units 102 may be seamlessly connected to the interior side 112 as a consequence of being integrally formed with the first wall 104 during a common manufacturing process, or may be secured or attached to the first wall 104 during an assembly process. The second wall 106 is also partially obstructed in the illustrated orientation, such that only a small segment of the second wall 106 is visible.

The illustrated portion of the panel 100 is disc-shaped with a circular perimeter, but the perimeter of the panel 100 may have a different shape in another embodiment, such as a rectangle or another polygon. The perimeter shape of the panel 100 may be customizable to fit on particular structures, such as engine compartment walls, interior cabin walls, exterior building walls, highway sound barrier walls, and the like. The perimeter shape may be customized during the manufacturing process of the panel 100 or after manufacturing via trimming, stamping, or otherwise removing segments of the panel 100 to provide a desired perimeter shape and size. The panel 100 is flat in the illustrated embodiment. The panel 100 optionally may have sufficiently small thickness and/or sufficient material properties to enable the panel 100 to bend and conform to contoured structures onto which the panel 100 is installed. In an alternative embodiment, the panel 100 may have a relatively rigid construction such that the panel 100 is not bendable, but the panel 100 may be formed during the manufacturing process to have an inherent contour or curvature based on the contour of structure onto which the panel 100 is installed.

The panel 100 may be oriented such that the first wall 104 of the panel 100 is closest to the one or more noise sources. Incident sound waves 113 from the noise source(s) impinge upon the first wall 104, and for this reason the first wall 104 is also referred to herein as incident wall 104. The second wall 106 is farthest away from the noise source(s) and is also referred to herein as back wall 106. The incident wall 104 defines a plurality of apertures 114 therethrough. The apertures 114 align with different corresponding frame units 102. At least some of the incident sound waves 113 penetrate the incident wall 104 through the apertures 114 and are received into the corresponding frame units 102. In at least one embodiment, the back wall 106 is solid and lacks apertures, so the back wall 106 blocks the sound waves 113 that enter the apertures 114 of the incident wall 104 from penetrating clean through the entire thickness of the panel 100. The panel 100 is designed such that the incident sound waves 113 that penetrate the incident wall 104 through the apertures 114 are redirected by the back wall 106 and are radially propagated through the frame units 102, which absorb and dissipate the energy of the sound waves 113.

In one or more embodiments, the panel 100 has a thickness 115 that is less than 20 mm. The thickness 115 refers to the combined thicknesses of the incident wall 104, the frame units 102, and the back wall 106. In a non-limiting example, the thickness 115 of the panel 100 may be less than 10 mm, such as about 6 mm. As used herein, terms modifying a value representative of a measurement, such as "approximately" and "about" means that the measurement is inclusive of the stated value as well as values above and below the stated value within a designated threshold range, which may be 1%, 3%, or 5% of the stated value. For example, deviations in dimensions may result from variability in production and processing, and such deviations are considered within the scope of the specified ranges disclosed herein. The sound attenuation panel 100 may be advantageously thinner and lighter (e.g., lightweight) than some known sound-absorbing materials.

Figure 2:
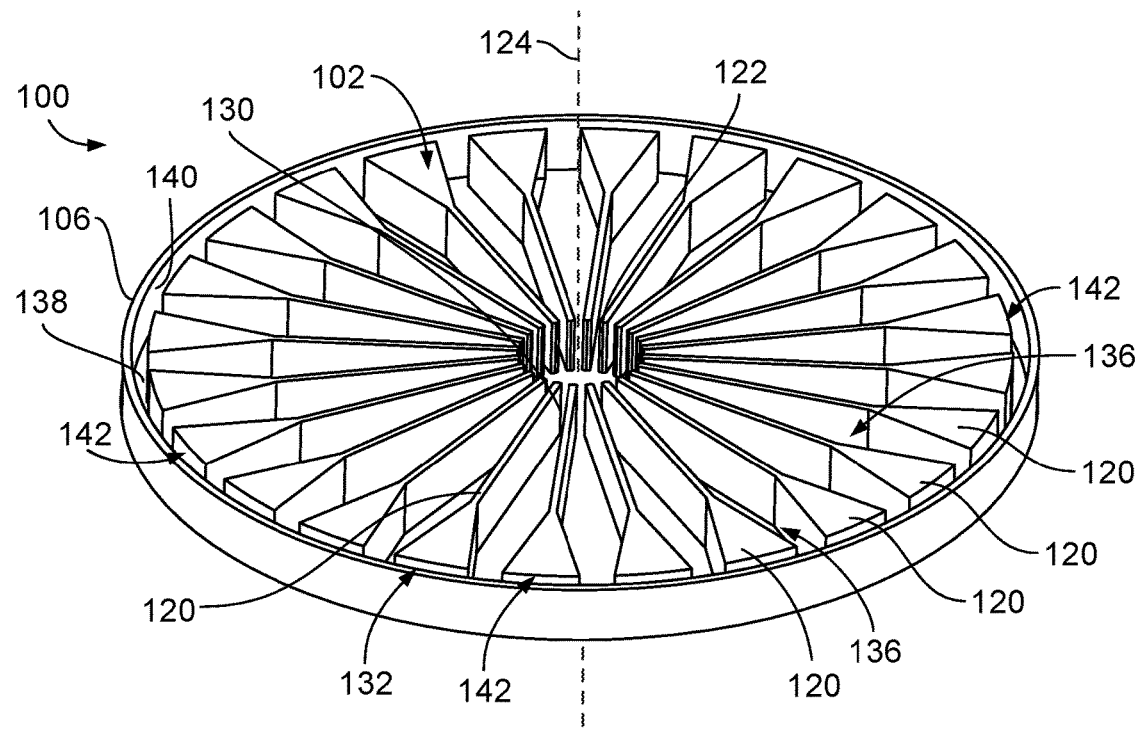
FIG. 2 is a close-up perspective view of the sound attenuation panel of FIG. 1 showing one frame unit thereof with an incident wall omitted.

FIG. 2 is a close-up perspective view of the sound attenuation panel 100 of FIG. 1 showing one of the frame units 102 thereof with the incident wall 104 omitted. The frame unit 102 has a plurality of spoke members 120 that radially extend from a central hub opening 122 of the frame unit 102. The central hub opening 122 aligns with a corresponding one of the apertures 114 of the incident wall 104 shown in FIG. 1. In an embodiment, all of the frame units 102 of the panel 100 are replicas of one another, and the frame unit 102 shown in FIG. 2 is representative of every frame unit 102. In an alternative embodiment, at least some of the frame units 102 of the panel 100 may have one or more variations from the frame unit 102 shown in FIG. 2, such as a different size of the outer perimeter or a different diameter of the central hub opening 122.

The central hub opening 122 defines a central axis 124. The spoke members 120 radially extend from the central hub opening 122 to resemble the spokes of a bicycle wheel. The spoke members 120 are rib-like members that are connected to both the back wall 106 and the incident wall 104 (shown in FIG. 1). The spoke members 120 are arranged in a common plane 208 (shown in FIG. 3) that is perpendicular to the central axis 124. Although the frame unit 102 includes a single central hub opening 122 in the illustrated embodiment, the frame unit 102 may have multiple central hub openings 122 in an alternative embodiment.

The spoke members 120 are spaced apart from one another. The spoke members 120 may be evenly spaced along the circumference of the central hub opening 122. For example, each spoke member 120 may define a respective spoke axis, and the angle between the spoke axes of each pair of adjacent spoke members 120 in the frame unit 102 may be constant. Each of the spoke members 120 has a respective inner end 130 and an outer end 132 opposite the inner end 130. The inner ends 130 are located at the central hub opening 122. The outer ends 132 of the spoke members 120 are located at an outer perimeter 142 of the frame unit 102. Optionally, the inner ends 130 of the spoke members 120 define the shape and boundary of the central hub opening 122. For example, the perimeter of the central hub opening 122 may be defined entirely by the inner ends 130 of the spoke members 120. In an embodiment, the spoke members 120 do not engage one another, and the inner ends 130 of adjacent spoke members 120 are spaced apart to define narrow gaps 134 (shown in FIG. 5). The frame unit 102 has a circular outer perimeter 142 in the illustrated embodiment, as defined by the outer ends 132 of the spoke members 120. The outer perimeter 142 of the frame unit 102 may have other shapes in other embodiments.

The frame unit 102 defines channels 136 between adjacent pairs of the spoke members 120. An adjacent pair of spoke members 120 represents two spoke members 120 of the same frame unit 102 that are immediately next to each other, without any other spoke members 120 between the two spoke members 120. The channels 136 are fluidly connected to the central hub opening 122 through the narrow gaps 134 between the inner ends 130 of the spoke members 120. The channels 136 are designed to receive the sound waves that enter the frame unit 102, such that the sound waves radially propagate through the channels 136 between the spoke members 120. The channels 136 may function similar to waveguides, as the channels 136 confine and control the propagation of the sound waves. In the alternative embodiment in which the frame unit 102 has multiple central hub openings 122, some of the channels 136 may be fluidly connected to different central hub openings 122. For example, a first subset of the channels 136 (representing one or more channels 136) may be fluidly connected to a first central hub opening 122, and a second subset of the channels 136 may be fluidly connected to a different, second central hub opening 122 of the same frame unit 102.

In an embodiment, the back wall 106 includes a planar base layer 138 and a rim 140 or lip. The rim 140 projects out of the plane 207 (shown in FIG. 3) of the base layer 138 into the common plane 208 (shown in FIG. 3) of the spoke members 120. The rim 140 surrounds the outer perimeter 142 of the frame unit 102, such that the rim 140 extends proximate to the outer ends 132 of the spoke members 120. Although the rim 140 is shown at the outer edge of the back wall 106 in FIG. 2, it is recognized that the back wall 106 shown in FIG. 2 may be merely a small area of the back wall 106, which is larger than the frame unit 102, as shown in FIG. 1. Thus, the planar base layer 138 may have a larger area that extends beyond the rim 140 shown in FIG. 2. In an alternative embodiment, the back wall 106 only has the planar base layer 138 and lacks the rim 140 portion. For example, in such an alternative embodiment, the outer perimeter 142 of the frame unit 102 is not enclosed or surrounded by any rim portion of either of the two walls 104, 106.

Figure 3:
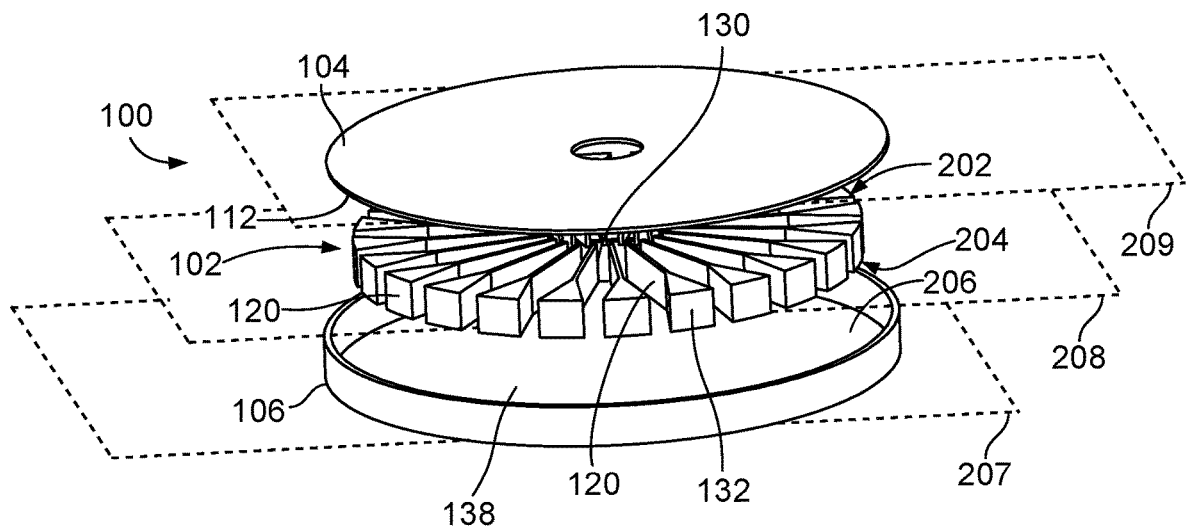
FIG. 3 is an exploded view of a portion of the sound attenuation panel showing a single frame unit and associated portions of the incident wall and back wall according to an embodiment.

FIG. 3 is an exploded view of a portion of the sound attenuation panel 100 showing a single frame unit 102 and associated portions of the incident wall 104 and back wall 106 according to an embodiment. In the exploded view, the frame unit 102 is spaced apart from both the incident wall 104 and the back wall 106 for descriptive purposes. The frame unit 102 has a first side 202 and a second side 204 opposite the first side 202. The first and second sides 202, 204 are defined by the spoke members 120. Although separated in the exploded view, the first side 202 engages the interior side 112 of the incident wall 104, and the second side 204 engages an interior side 206 of the back wall 106. The incident wall 104 and the back wall 106 are both planar and are parallel to each other.

The spoke members 120 of the frame unit 102 are arranged in a common plane 208 that is parallel to both the incident wall 104 and the back wall 106. For example, the common plane 208 may be parallel to a plane 209 of the incident wall 104 and to the plane 207 of the base layer 138 of the back wall 106. In the illustrated embodiment, each of the spoke members 120 has a uniform thickness from the inner end 130 thereof to the outer end 132 thereof. The thickness is measured along the central axis 124. Furthermore, the spoke members 120 of the frame unit 102 have a constant and uniform thickness relative to one another, such that a first spoke member 120 has approximately the same thickness (e.g., identical except for imperfections and blemishes) as a second spoke member 120 and a third spoke member 120.

In one or more embodiments, the frame units 102 of the panel 100 are integrally connected to both the incident wall 104 and the back wall 106 to define a one-piece, unitary, monolithic structure. For example, the panel 100 may be produced via an additive manufacturing process, such as 3D printing, vapor fusion deposition, or the like. Therefore, the frame units 102, the back wall 106, and the incident wall 104 may be formed during a common manufacturing process. For example, the back wall 106 may be formed first, and then the spoke members 120 of the frame units 102 are formed in-situ on the interior side 206 of the back wall 106. The spoke members 120 are formed in-situ on the back wall 106 such that the spoke members 120 are not formed separately from the back wall 106. For example, the spoke members 120 may be formed by consecutively depositing a plurality of layers of material in specific locations directly onto the back wall 106 to gradually build the thickness of each spoke member 120. Then, the incident wall 104 may be formed in-situ on the spoke members of the frame units 102. Alternatively, the order may be reversed such that the incident wall 104 is formed first and the spoke members 120 are formed in-situ on the incident wall 104. Due to the additive manufacturing process, the frame units 102 and the wall 104, 106 are integrally connected such that there are no seams at the interfaces between the components.

In an alternative embodiment, the frame units 102 are formed integrally to only one of the two walls 104, 106 via an additive manufacturing process, and the other of the two walls 104, 106 is separately formed and subsequently mounted to the frame units 102 to produce the panel 100. In another alternative embodiment, the frame units 102 and both of the walls 104, 106 may be formed as separate and discrete components in different processes, and the integral connection between the components may be accomplished by permanently (e.g., chemically) bonding the components to one another after formation, such as through welding or brazing.

The panel 100 may be composed of a polymeric material, such as one or more plastics or other polymers. In a non-limiting example, the panel 100 may be composed of a polyamide material. The panel 100 may include different materials in other embodiments, such as metals, composite materials, ceramics, or the like. For example, including ceramics or other heat-resistance materials within the composition of the panel 100 may allow the panel 100 to withstand high operating temperatures. High operating temperatures may be experienced near an engine of an aircraft or other vehicle.

Figure 4:
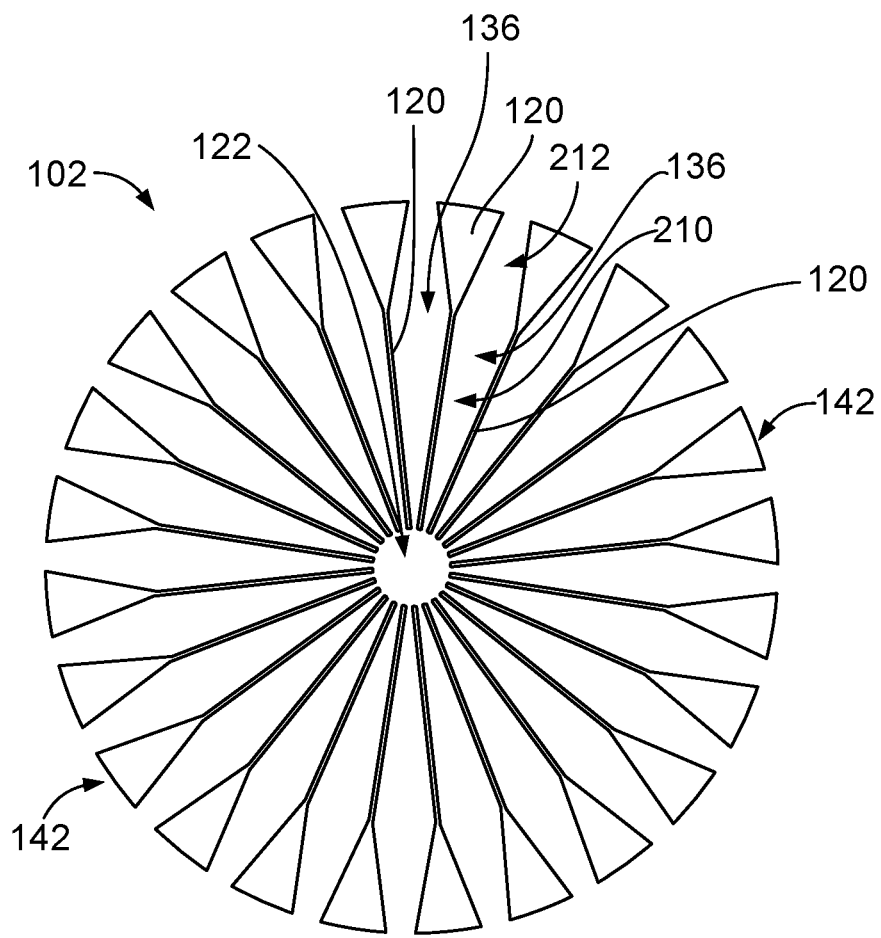
FIG. 4 is a plan view of one of the frame units of the sound attenuation panel according to the embodiment shown in FIGS. 1 through 3.

FIG. 4 is a plan view of one of the frame units 102 of the sound attenuation panel 100 according to the embodiment shown in FIGS. 1 through 3. In the illustrated embodiment, the central hub opening 122 and the outer perimeter 142 of the frame unit 102 both have circular shapes. The channels 136 defined between the spoke members 120 radially extend from the central hub opening 122 to the outer perimeter 142. The channels 136 are open (e.g., fluidly connected) to both the central hub opening 122 and the outer perimeter 142.

In one or more embodiments, each of the channels 136 has a diverging region 210 and a converging region 212. The diverging region 210 of a respective channel 136 is disposed between the central hub opening 122 and the converging region 212 of the channel 136. A width of the channel 136 (e.g., representing the distance between the adjacent spoke members 120 that define the channel 136) gradually increases along the diverging region 210 in a direction away from the central hub opening 122. The width of the channel 136 gradually decreases along the converging region 212 in the direction away from the central hub opening 122. For example, the width of the channel 136 along the diverging region 210 increases with increasing distance from the central hub opening 122, and the width of the channel 136 along the converging region 212 decreases with increasing distance from the central hub opening 122.

Figure 5:
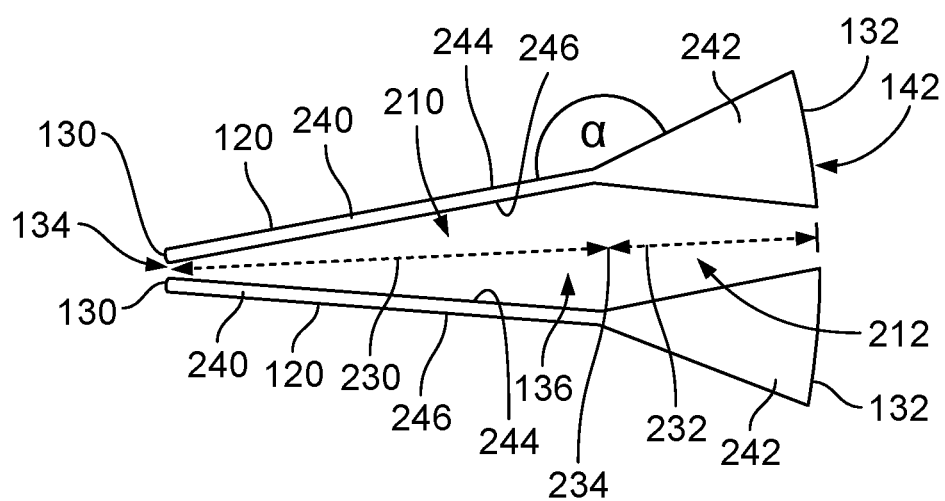
FIG. 5 is a close-up view of two adjacent spoke members of the frame unit shown in FIG. 4 showing a channel defined between the spoke members.

FIG. 5 is a close-up view of two adjacent spoke members 120 of the frame unit 102 shown in FIG. 4 showing the channel 136 defined between the spoke members 120. The diverging region 210 of the channel 136 extends a length 230 from the inner ends 130 of the spoke members 120 to an interface 234 with the converging region 212. The diverging region 210 diverges such that the width of the channel 136 at the narrow gap 134 defined between the inner ends 130 is less than the width of the channel 136 at the interface 234. The converging region 212 extends a length 232 from the interface 234 with the diverging region 210 to the outer ends 132 of the spoke members 120 at the outer perimeter 142 of the frame unit 102. The converging region 212 converges such that the width of the channel 136 at the interface 234 is greater than the width of the channel 136 between the outer ends 132.

The channel 136 forms a resonance cavity that absorbs the energy of the sound waves received therein as the sound waves propagate away from the central hub opening 122 (shown in FIG. 4). For example, a sound wave propagated through the channel 136 from the central hub opening 122 expands through the diverging region 210 and then contracts through the converging region 212. The sound wave may resonate and/or vibrate within the channel 136 due to the Helmholtz effect, which dissipates energy from the sound wave.

In the illustrated embodiment, each of the spoke members 120 has a narrow segment 240 and a broad segment 242. The broad segment 242 has a greater width than the narrow segment 240. The width of the spoke member 120 is defined between a first channel side 244 of the spoke member 120 and an opposite, second channel side 246 of the spoke member 120. The first and second channel sides 244, 246 of each spoke member 120 define portions of different channels 136. The narrow segment 240 radially extends from the inner end 130 of the spoke member 120 to the broad segment 242. The broad segment 242 radially extends from the narrow segment 240 to the outer end 132 of the spoke member 120. In the illustrated embodiment, the width of the spoke member 120 is uniform along the length of the narrow segment 240. For example, the narrow segment 240 is thin and linear. The width of the spoke member 120 along the broad segment 242 is not uniform in the illustrated embodiment. For example, the width gradually increases along the length of the broad segment 242 in an outward direction from the narrow segment 240 towards the outer end 132. The broad segment 242 has a generally triangular shape in the plan view shown in FIG. 5. The spoke members 120 may define an obtuse angle (a) between the first channel side 244 along the narrow segment 240 and the first channel side 244 along the broad segment 242. Similarly, the spoke members 120 may define obtuse angles between the narrow and broad segments 240, 242 along the second channel sides 246 thereof.

The narrow segment 240 may have a longer length than the broad segment 242. For example, the length of the first channel side 244 of each spoke member 120 along the narrow segment 240 (e.g., $L_1$) may be multiple times greater than the length of the first channel side 244 along the broad segment 242 (e.g., $L_2$). In a non-limiting example that is not shown in FIG. 5, the length of the narrow segment 240 ($L_1$) may be ten times as long as the length of the broad segment 242 ($L_2$).

In one experimental example, a sound attenuation panel 100 was constructed for testing and numerical modeling according to the embodiments shown in FIGS. 1 through 5 to determine sound dampening performance of the panel 100. In the experimental example, the panel 100 was composed of a polyamide material. Each frame unit 102 had a diameter of the central hub opening 122 of about 15 mm and a diameter of the circular outer perimeter 142 of about 100 mm. The panel 100 had a thickness of about 6 mm. The panel 100 was tested using a standardized impedance tube test. The results of the testing indicate that the panel 100 demonstrated significant sound absorption in the low frequency domain (e.g., less than 1600 Hz). For example, the panel 100 demonstrated a relatively high absorption coefficient of greater than 40% over a wide frequency range from about 630 Hz to about 1000 Hz. The panel 100 had almost perfect absorption at 800 Hz, with an absorption coefficient measured at 0.998 out of 1.0.

Figure 6:
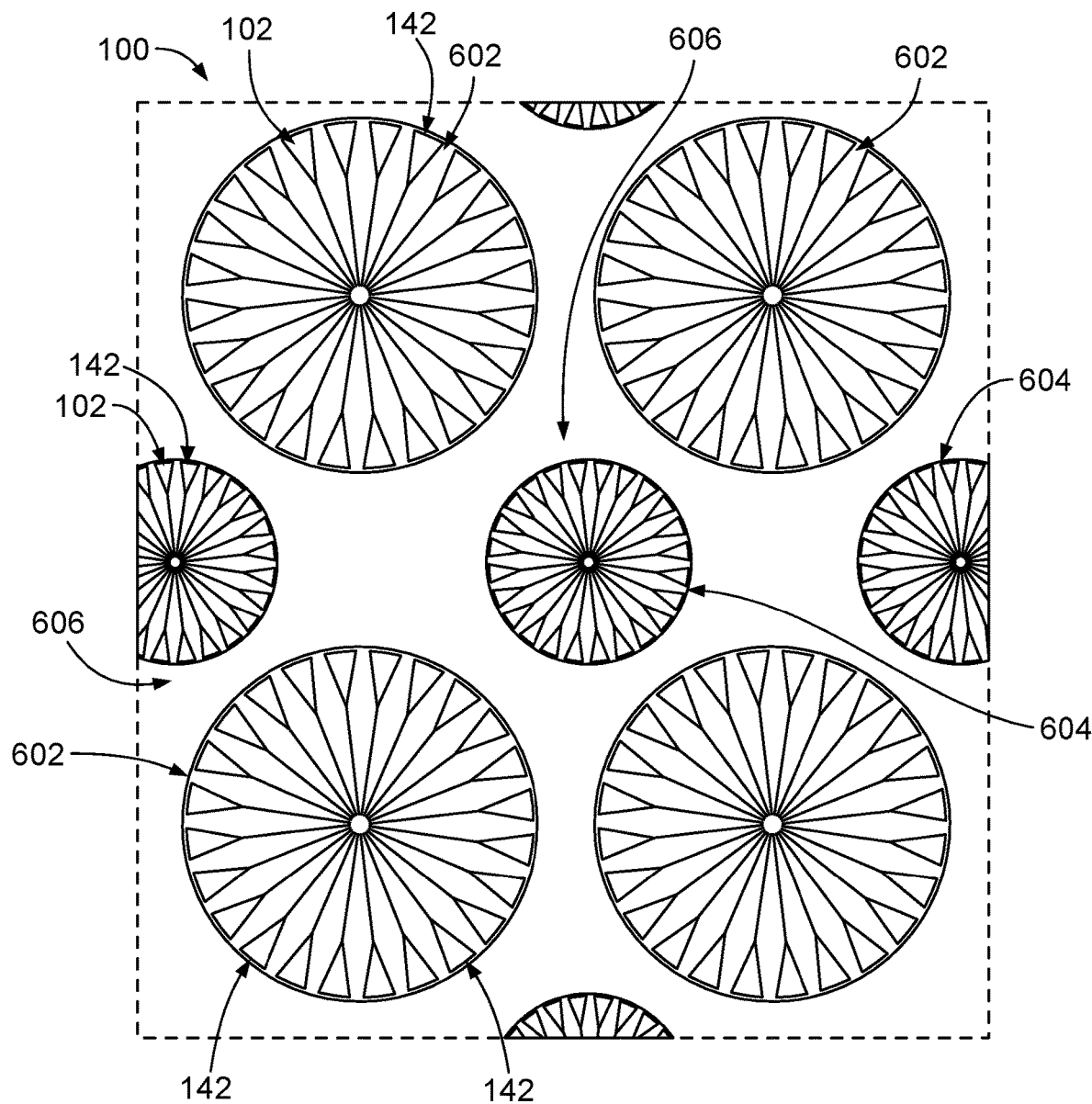
FIG. 6 is a plan view of a portion of the sound attenuation panel according to a second embodiment showing multiple frame units in the array.

FIG. 6 is a plan view of a portion of the sound attenuation panel 100 according to a second embodiment showing multiple frame units 102 in the array. In the illustrated embodiment, the frame units 102 have circular outer perimeters 142, similar to the frame units 102 of the embodiment shown in FIGS. 1 through 5. However, some of the frame units 102 have different sizes such that the outer perimeters 142 have different diameters. For example, the array includes large frame units 602 and small frame units 604. The small frame units 604 are nested in the interstitial regions 606 between groups of the large frame units 602. For example, the interstitial regions 606 are too small to accommodate an additional large frame unit 602, and therefore may remain unoccupied if not for the presence of the small frame units 604. The addition of the small frame units 604 increases the percentage of the area of the panel 100 that contains frame units 102, and therefore may improve the sound absorbing properties of the panel 100 relative to a panel 100 having less area occupied by frame units 102.

Figure 7:
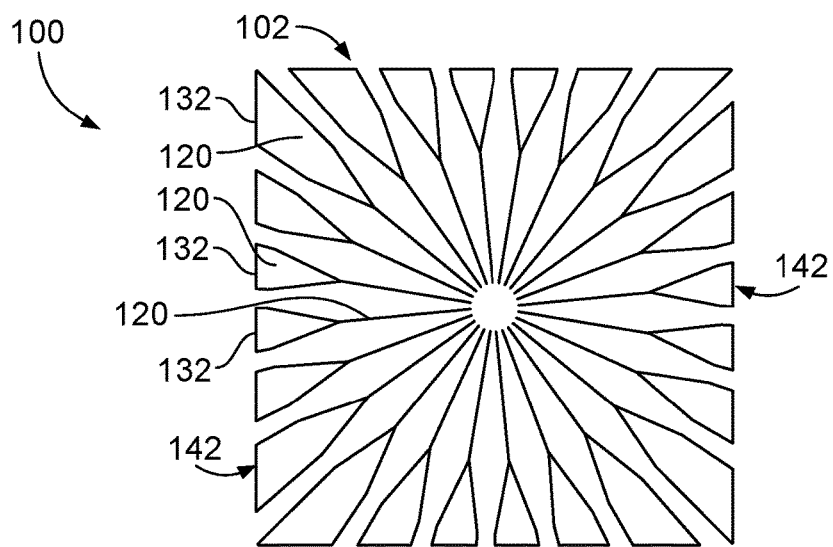
FIG. 7 is a plan view of a portion of the sound attenuation panel according to a third embodiment showing a single frame unit.

FIG. 7 is a plan view of a portion of the sound attenuation panel 100 according to a third embodiment showing a single frame unit 102. In the illustrated embodiment, the frame unit 102 has radially extending spoke members 120. The outer ends 132 of the spoke members 120 define a polygonal outer perimeter 142 of the frame unit 102, as opposed to the circular outer perimeters 142 of the frame units 102 shown in FIGS. 1 through 6. For example, the outer perimeter 142 in FIG. 7 has a rectangular shape with four linear sides. The outer perimeter 142 may or may not be square with four equal side lengths. The rectangular outer perimeter 142 may enable denser packing (e.g., tiling and stacking) of the frame units 102 side by side in the array relative to the circular outer perimeters 142. In other embodiments, the outer perimeters 142 of the frame units 102 may define other polygonal shapes, such as pentagons, hexagons, or the like.

Figure 8:
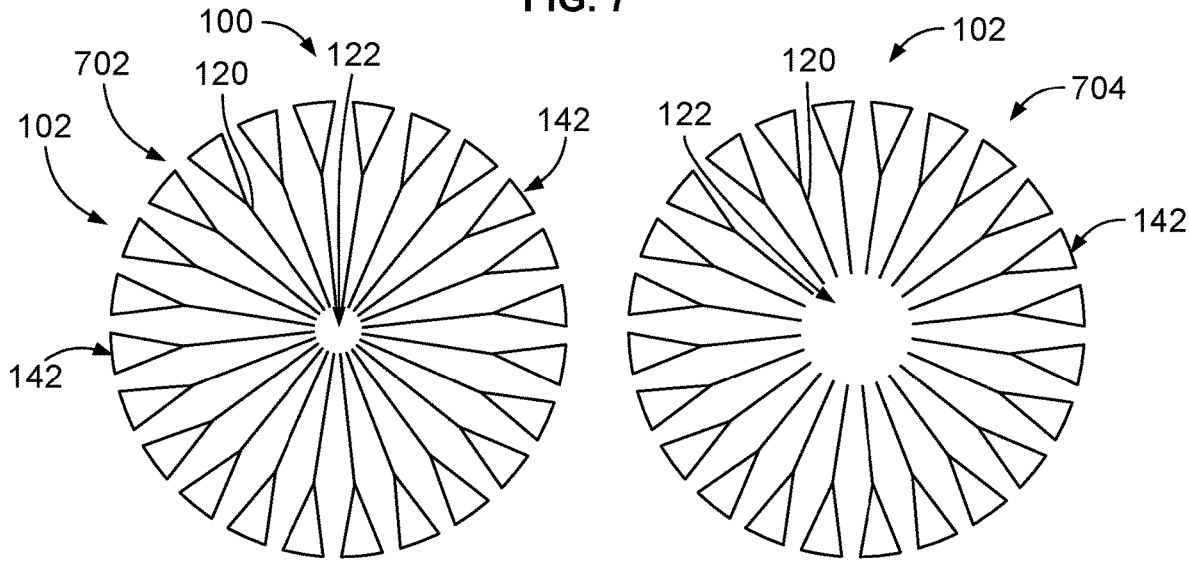
FIG. 8 is a plan view of a portion of the sound attenuation panel according to a fourth embodiment showing two adjacent frame units in the array.

FIG. 8 is a plan view of a portion of the sound attenuation panel 100 according to a fourth embodiment showing two adjacent frame units 102 in the array. The two frame units 102 include a first frame unit 702 and a second frame unit 704. The two frame units 702, 704 both have radially extending spoke members 120, and both define circular outer perimeters 142 of the same size (e.g., diameter). The first frame unit 702 differs from the second frame unit 704 in the size of the central hub opening 122. For example, the central hub opening 122 of the second frame unit 704 has a larger diameter than the central hub opening 122 of the first frame unit 702. The variance in the central hub opening diameters may enable the sound attenuation panel 100 to dampen a broader range of frequencies than if all of the frame units 102 have the same central hub opening diameter.

For example, the geometric parameters of the panel 100 affect the sound-absorbance or sound transmission loss of the panel 100, including the amount of energy absorbed and the frequency range that is absorbed. The parameters of the frame units 102 can be customized in order to tune the panel 100 for desired sound-absorbing properties, such as to dampen specific frequency ranges. During experimental testing, it was determined that the diameter of the central hub opening 122 may affect the resonant frequency, such that modifying the diameters shifts the resonant frequencies. For example, the first frame unit 702 with the smaller central hub opening 122 may provide peak sound dampening in a lower frequency range than the second frame unit 704 with the larger central hub opening 122. The two frequency ranges may at least partially overlap. By constructing the panel 100 to include frame units having different geometric parameters, such as different central hub opening diameters, the panel 100 may be able to provide sound dampening along a broader frequency range than if all of the frame units 102 have identical geometric parameters.

Other parameters that may be modified and/or customized to achieve dampening in desired frequency ranges include the diameter and/or number of the apertures 114 in the incident wall 104 and the geometry of the spoke members 120 of the frame units 702, 704. For example, the number, width, length, height, spacing, and/or orientation of the spoke members 120 in the frame units 702, 704 can affect the magnitude and frequency of sound-absorbance because the sound waves resonate within the channels 136 between the spoke members 120. In a non-limiting example, a first frame unit that has wider channels and fewer spoke members 120 than a second frame unit may absorb sound in a lower frequency range than the sound absorbed by the second frame unit. In another non-limiting example, the incident wall 104 may include additional openings therethrough besides the apertures 114 that align with the central hub openings 122. For example, the incident wall 104 may be manufactured with a uniform array of openings, some of which align with the central hub openings 122 and represent the apertures 114.

In an alternative embodiment, at least some of the frame units 702, 704 may have multiple, discrete openings that lead to the channels 136 between the spoke members 120 instead of a single central hub opening 122 from which all channels 136 emanate. In a non-limiting example, each of the channels 136 may be connected to an aperture 114 in the incident wall 104 via a different corresponding opening. In another non-limiting example, a first subset of the channels 136 are connected to a first aperture 114 in the incident wall 104 via a first opening in the frame unit 702, 704, and a second subset of the channels 136 in the same frame unit 702, 704 are connected to a second aperture 114 in the incident wall 104 via a second opening in the frame unit 702, 704. The number and sizes of the openings in each of the frame units 702, 704 may be selected to tune the frequencies at which the frame unit 702, 704 absorbs sound. For example, the single central hub opening 122 shown in the illustrated embodiments may absorb sound at a lower frequency range than having multiple, smaller openings that connect the channels 136 to the incident wall 104.

Figure 9:
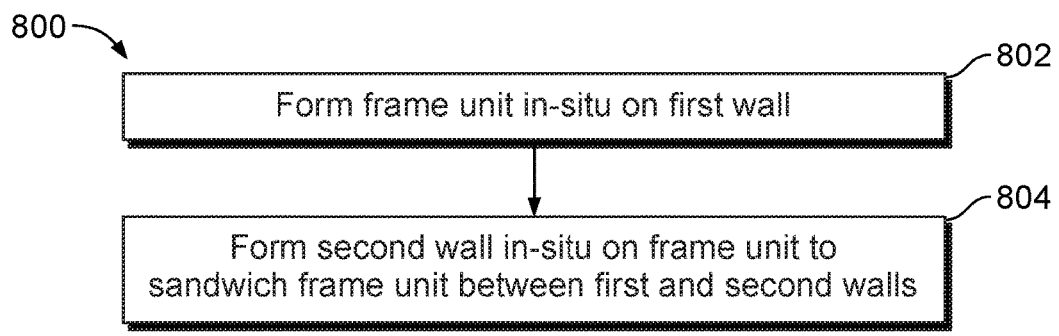
FIG. 9 is a flow chart of a method for producing a sound attenuation panel according to an embodiment.

FIG. 9 is a flow chart of a method 800 for producing a sound attenuation panel according to an embodiment. The method 800 may produce one or more of the embodiments of the sound attenuation panel 100 shown in FIGS. 1 through 8. The method 800 may include additional steps, fewer steps, and/or different steps than the illustrated flowchart in FIG. 9.

With additional reference to FIGS. 1 through 8, the method 800 begins at 802, at which a frame unit 102 is formed in-situ on a first wall. The first wall may be the incident wall 104 or the back wall 106. The frame unit 102 is formed to include multiple spoke members 120 spaced apart from one another and radially extending from a central hub opening 122 of the frame unit 102. The frame unit 102 defines channels 136 between adjacent pairs of the spoke members 120, and the channels 136 are fluidly connected to the central hub opening 122.

At 804, a second wall is formed in-situ on the frame unit along an opposite side of the frame unit 102 from the first wall. In one embodiment, the first wall is the incident wall 104 shown in FIG. 1 and the second wall is the back wall 106 shown in FIG. 1. The incident wall 104 defines an aperture 114 through which sound waves are received into the central hub opening 122 of the frame unit 102. In another embodiment, the first wall is the back wall 106, and the second wall is the incident wall 104. Upon completion of the second wall, the frame unit 102 is sandwiched between the two walls 104, 106. The frame unit 102 is configured to receive sound waves into the central hub opening 122 through the aperture 114 in the incident wall 104. The sound waves are radially distributed into the various channels 136 between the spoke members 120, and the sound waves dissipate as the sound waves propagate through the channels 136.

Optionally, the frame unit 102 and the second wall may be formed via additive manufacturing. Optionally, the frame unit 102 may be a first frame unit 102 of a plurality of the frame units 102 spaced apart in an array between the two walls 104, 106.

The sound attenuation panel 100 produced by the method 800 may be installed within an interior cabin of a vehicle to provide noise dampening, or may be installed facing a noise emitter, such as an engine of a vehicle. The vehicles on which the sound attenuation panels 100 are installed may include aircraft, automobiles, buses, rail vehicles, sea craft, spacecraft, and the like. The sound attenuation panel 100 may also be installed outside of vehicles, such as in factories or homes, or along highway sound barriers.

Figure 10:
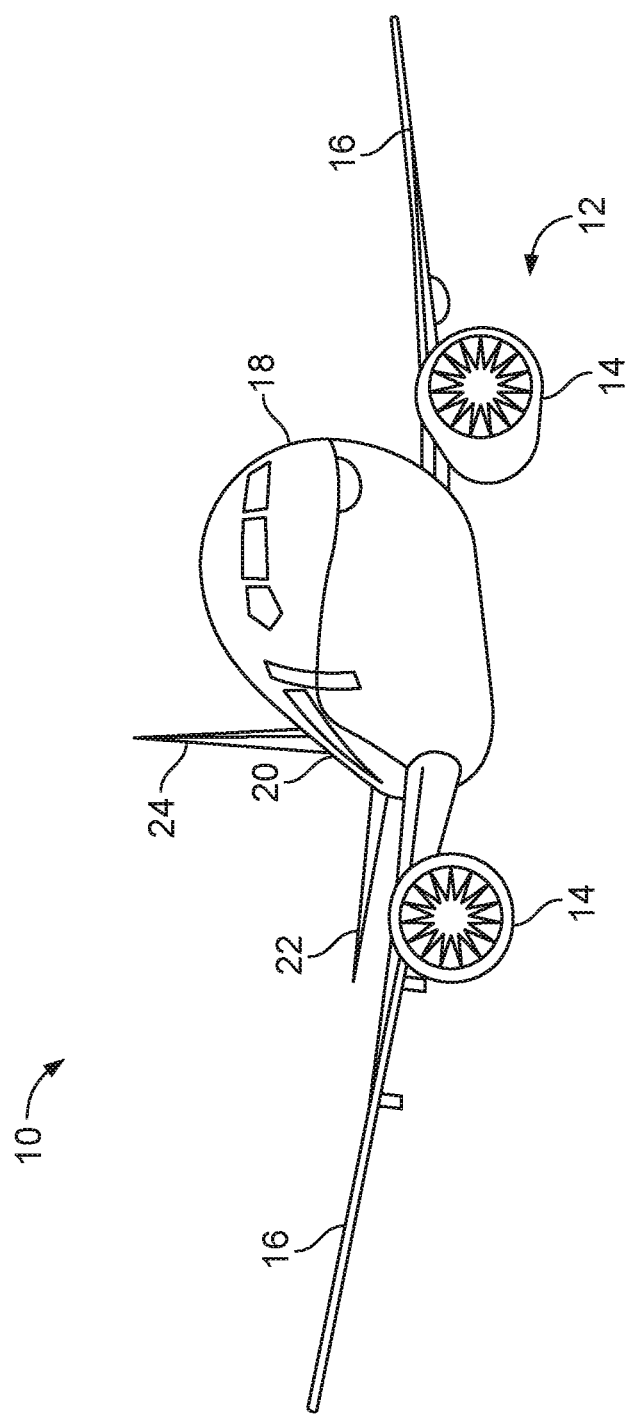
FIG. 10 illustrates a front perspective view of an aircraft according to an embodiment of the present disclosure.

FIG. 10 illustrates a front perspective view of an aircraft 10 according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24. The fuselage 18 of the aircraft 10 defines an interior cabin 30 (shown in FIG. 11).

Figure 11:
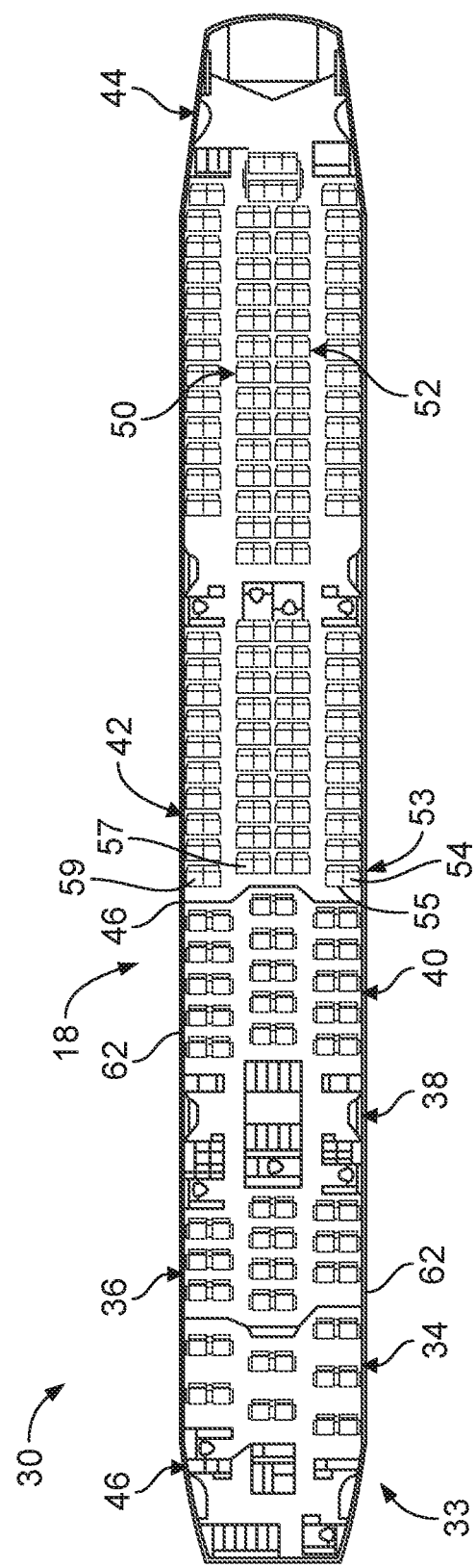
FIG. 11 illustrates a top plan view of an interior cabin of the aircraft shown in FIG. 10.

FIG. 11 illustrates a top plan view of the interior cabin 30 of the aircraft 10 shown in FIG. 10. The interior cabin 30 may be defined by one or more fuselage walls 62. The interior cabin 30 may be a passenger cabin that is divided into multiple sections or zones, including a front section 33, a first class section 34, a business class section 36, a front galley station 38, a business section 40 (e.g., an expanded economy or coach section), a standard economy or coach section 42, and an aft section 44, which may include multiple lavatories and galley stations. It is to be understood that the interior cabin 30 may include more or less sections and zones than shown. For example, the interior cabin 30 may not include a first-class section and/or may include more or less galley stations than shown. Each of the sections may be separated by a cabin transition area 46, which may include class divider assemblies. Overhead stowage bin assemblies may be positioned throughout the interior cabin 30.

As shown in FIG. 11, the interior cabin 30 includes two aisles 50, 52 that lead to the aft section 44. Optionally, the interior cabin 30 may have less or more than two aisles. For example, the interior cabin 30 may include a single aisle that extends through the center of the interior cabin 30 that leads to the aft section 44. The interior cabin 30 includes rows 53 of seats 54 that span across the interior cabin 30 and generally extend across the aisles 50 and 52. Three columns 55, 57, 59 of seat sections extend perpendicular to the rows 53. Each seat section may include one or more seats 54. The columns 55, 57, 59 generally run parallel with the aisles 50, 52. A particular section or zone may include any number of columns 55, 57, 59 of seat sections. As shown in FIG. 11, at least one zone includes three columns 55, 57, and 59 of seat sections. However, each zone may include more or less than three columns.

The interior cabin 30 may include sound attenuation panels formed according to one or more of the embodiments described herein. The sound attenuation panels may be mounted along (or within) the fuselage walls 62. Additionally, or alternatively, the sound attenuation panels may be positioned proximate to the engines 14 (shown in FIG. 10) to shield the interior cabin 30 from engine noise. The sound attenuation panels may be configured to absorb and attenuate low-frequency noise to reduce the level of engine noise within the interior cabin 30.

A method of installing the sound attenuation panel 100 on the aircraft 10 according to an embodiment includes providing the sound attenuation panel 100. The sound attenuation panel 100 may be the panel 100 described with reference to FIG. 1 through 8, such that the panel 100 includes an incident wall 104 and multiple frame units 102 connected to and extending from the incident wall 104. The incident wall 104 defines multiple apertures 114 therethrough. Each of the frame units 102 includes multiple spoke members 120 spaced apart from one another and radially extending from a central hub opening 122 of the respective frame unit 102. The frame units 102 defining channels 136 between adjacent pairs of the spoke members 120. The channels 136 radially emanate from the central hub openings 122.

The method of installing the sound attenuation panel 100 on the aircraft 10 also includes affixing the sound attenuation panel 100 to a wall of the aircraft 10 such that the frame units 102 are disposed between the incident wall 104 and the wall of the aircraft 10. The wall of the aircraft 10 in an embodiment is a fuselage wall 62 that is disposed along the interior cabin 30. In another embodiment, the wall of the aircraft 10 may be a wall that faces a noise emitter, such as a wall of an engine compartment (e.g., cowl) that faces one of the engines 14. The sound attenuation panel 100 may be affixed to the wall of the aircraft 10 via an adhesive and/or fasteners. For example, the adhesive may be an epoxy, glue, or the like. The fasteners may be bolts, screws, clamps, clips, rivets, or the like. Once installed on the aircraft 10, the frame units 102 of the sound attenuation panel 100 are configured to receive sound waves into the respective central hub openings 122 thereof through the incident wall 104, and to dissipate the sound waves through the channels 136 between the spoke members 120.

Optionally, the sound attenuation panel 100 may be retrofitted on the walls of an existing aircraft 10 to provide improved sound dampening. For example, prior to installing the sound attenuation panel 100, the method may include removing an existing panel or wall covering that is present on the wall of the aircraft 10. The panel or wall covering that is removed may be another type of sound attenuation panel that has inferior performance and/or other properties relative to the sound attenuation panel 100 described herein. For example, the other sound attenuation panel that is removed may be heavier and/or thicker than the sound attenuation panel 100 described herein, and/or may not be able to provide the same level of sound dampening in the frequencies of interest.

One or more embodiments of the present disclosure are directed to a thin acoustic metastructure with subwavelength dimensions that may provide almost perfect sound absorption in the low-frequency regime. The metastructure is composed of a thin panel and a frame backed with a rigid plate. The frame includes multiple spokes, which form periodic converging-diverging channels. The acoustic scalar waves propagate along these channels from the center point to the outer periphery, leading to slowed sound propagation. By controlling the geometrical parameters of the structure, the resonance frequency and absorption coefficient can be tuned. A hybrid regression cum genetic algorithm-based approach was utilized to optimize the dimensions of the metastructure to achieve a highly absorptive structure. The finite element-based numerical simulations and experiments demonstrated the broadband sound absorption capabilities of the structure.

A sound attenuation panel according to one or more embodiments includes an incident wall, a back wall, and multiple frame units disposed between the incident wall and the back wall. The incident wall defines multiple apertures therethrough. The frame units are connected to both the incident wall and the back wall and are arranged in an array. Each of the frame units includes multiple spoke members spaced apart from one another and radially extending from a central hub opening of the respective frame unit to define channels between adjacent pairs of the spoke members. The central hub openings of the frame units align with different corresponding apertures of the incident wall. The frame units are configured to receive sound waves into the respective central hub openings thereof through the corresponding apertures of the incident wall to dissipate the sound waves through the channels between the spoke members.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person of ordinary skill in the art to practice the various embodiments of the disclosure, including making and using any devices or systems and performing any incorporated methods. The patentable scope of the various embodiments of the disclosure is defined by the claims, and may include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A sound attenuation panel comprising:
   an incident wall defining an aperture therethrough; and
   a frame unit connected to the incident wall, the frame unit including multiple spoke members spaced apart from one another and radially extending from one or more central hub openings of the frame unit, the one or more central hub openings aligning with the aperture of the incident wall, wherein the frame unit defines channels between adjacent pairs of the spoke members, and wherein the frame unit is configured to receive sound waves into the one or more central hub openings through the aperture of the incident wall to dissipate the sound waves through the channels between the spoke members.

2. The sound attenuation panel of claim 1, further comprising a back wall, wherein the frame unit has a first side that engages the incident wall, and the frame unit has a second side, opposite the first side, that engages the back wall.

3. The sound attenuation panel of claim 1, wherein the spoke members of the frame unit are arranged in a common plane that is parallel to a plane of the incident wall, and the one or more central hub openings define a central axis that is perpendicular to the common plane of the spoke members.

4. The sound attenuation panel of claim 1, wherein each of the spoke members radially extends from an inner end thereof at the one or more central hub openings to an outer end thereof at an outer perimeter of the frame unit, wherein the outer perimeter of the frame unit has a circular shape or a polygonal shape.

5. The sound attenuation panel of claim 1, wherein each of the spoke members radially extends from an inner end thereof at the one or more central hub openings to an outer end thereof, wherein the channels between the adjacent pairs of the spoke members are fluidly connected to the one or more central hub openings via gaps defined between the inner ends of the spoke members in the adjacent pairs.

6. The sound attenuation panel of claim 1, wherein each of the channels has a diverging region and a converging region, the diverging region disposed between the one or more central hub openings and the converging region, wherein a width of the channel between the adjacent pair of spoke members gradually increases along the diverging region in a direction away from the one or more central hub openings and the width of the channel gradually decreases along the converging region in the direction away from the one or more central hub openings.

7. The sound attenuation panel of claim 1, wherein each of the spoke members has a narrow segment and a broad segment, the broad segment having a greater width than the narrow segment, the narrow segment radially extending from an inner end of the respective spoke member at the one or more central hub openings to the broad segment, the broad segment radially extending from the narrow segment to an outer end of the respective spoke member at an outer perimeter of the frame unit.

8. The sound attenuation panel of claim 1, wherein the frame unit is a first frame unit of multiple frame units of the sound attenuation panel, all of the frame units connected to an interior side of the incident wall, wherein the aperture of the incident wall is a first aperture and the incident wall defines multiple apertures that align with different corresponding central hub openings of the frame units.

9. The sound attenuation panel of claim 8, wherein the spoke members of each of the frame units extend from the one or more central hub openings thereof to an outer perimeter of the respective frame unit, wherein the outer perimeter of the first frame unit has a different size than the outer perimeter of at least one of the other frame units.

10. The sound attenuation panel of claim 8, wherein each of the frame units has a single respective central hub opening, the central hub opening of the first frame unit having a different diameter than the central hub opening of at least one of the other frame units.

11. The sound attenuation panel of claim 1, wherein the incident wall has an exterior side and an interior side opposite the exterior side, the frame unit having a first side that engages the interior side of the incident wall and a second side that is opposite the first side, wherein a thickness of the sound attenuation panel from the exterior side of the incident wall to the second side of the frame unit is less than 10 mm.

12. The sound attenuation panel of claim 1, wherein the spoke members of the frame unit are seamlessly connected to the incident wall to define a one-piece, monolithic structure.

13. A method for constructing a sound attenuation panel, the method comprising:
   forming a frame unit in-situ on a first wall, the frame unit including multiple spoke members spaced apart from one another and radially extending from a central hub opening of the frame unit, wherein the frame unit defines channels between adjacent pairs of the spoke members, the channels fluidly connected to the central hub opening; and
   forming a second wall in-situ on the frame unit along an opposite side of the frame unit from the first wall, wherein one of the first wall or the second wall defines an aperture that aligns with the central hub opening of the frame unit, the frame unit configured to receive sound waves into the central hub opening through the aperture to dissipate the sound waves through the channels between the spoke members.

14. The method of claim 13, wherein the frame unit and the second wall are formed via additive manufacturing.

15. The method of claim 13, wherein the frame unit is formed on an interior side of the first wall, and the frame unit is formed such that a thickness of the frame unit from the interior side of the first wall to an interior side of the second wall that engages the frame unit is less than 10 mm.

16. The method of claim 13, wherein the frame unit is a first frame unit, and the method further comprises forming a plurality of frame units in-situ on the first wall, the frame units spaced apart from one another in a common plane.

17. The method of claim 13, wherein forming the frame unit comprises forming the spoke members such that each of the channels between the spoke members has a diverging region and a converging region, the diverging region disposed between the central hub opening and the converging region, wherein a width of the channel between the spoke members gradually increases along the diverging region in a direction away from the central hub opening and the width of the channel gradually decreases along the converging region in the direction away from the central hub opening.

18. A method for installing a sound attenuation panel on an aircraft, the method comprising:

providing the sound attenuation panel that includes an incident wall and multiple frame units connected to and extending from the incident wall, the incident wall defining multiple apertures therethrough, each of the frame units including multiple spoke members spaced apart from one another and radially extending from a central hub opening of the respective frame unit, the frame units defining channels between adjacent pairs of the spoke members, the channels radially emanating from the central hub openings; and affixing the sound attenuation panel to a wall of the aircraft such that the frame units are disposed between the incident wall and the wall of the aircraft, wherein the frame units are configured to receive sound waves into the central hub openings through the incident wall, and to dissipate the sound waves through the channels between the spoke members.

19. The method of claim 18, wherein the wall of the aircraft is disposed within an interior cabin of the aircraft or within an engine compartment of the aircraft.

20. The method of claim 18, further comprising removing a panel or wall covering that is present on the wall of the aircraft prior to affixing the sound attenuation panel to the wall of the aircraft.

* * * * *